United States Patent
Sawyer

(10) Patent No.: US 6,675,020 B2
(45) Date of Patent: Jan. 6, 2004

(54) SELF-SACRIFICING CELLULAR SYSTEM

(75) Inventor: François Sawyer, St-Hubert (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 485 days.

(21) Appl. No.: 09/781,946

(22) Filed: Feb. 14, 2001

(65) Prior Publication Data

US 2002/0111182 A1 Aug. 15, 2002

(51) Int. Cl.$^7$ ................................. H04Q 7/20
(52) U.S. Cl. .................... 455/522; 455/67.1; 455/69
(58) Field of Search .................... 455/522, 69, 67.1, 455/63, 517, 68, 527, 70, 222; 370/318; 375/345

(56) References Cited

U.S. PATENT DOCUMENTS

| | | | |
|---|---|---|---|
| 5,377,222 A | | 12/1994 | Sanderford, Jr. ............... 375/1 |
| 5,448,754 A | | 9/1995 | Ho et al. ..................... 455/34.1 |
| 5,822,362 A | * | 10/1998 | Friedmann ................... 375/200 |
| 5,970,399 A | * | 10/1999 | Rostamy et al. ............. 455/222 |
| 6,026,131 A | * | 2/2000 | Laurent et al. .............. 375/345 |
| 6,055,415 A | * | 4/2000 | Suzuki .......................... 4/200 |
| 6,219,559 B1 | * | 4/2001 | Hill et al. .................... 455/522 |
| 6,438,356 B1 | * | 8/2002 | Lilja et al. ..................... 455/63 |
| 6,445,930 B1 | * | 9/2002 | Bartelme et al. ............ 455/522 |

* cited by examiner

*Primary Examiner*—Nay Maung
*Assistant Examiner*—Tan Trinh
(74) *Attorney, Agent, or Firm*—Alex, Nicolaescu, Ericsson, Canada, Inc.

(57) ABSTRACT

In a cellular telecommunications network, a method and a cell radio controller for reducing Out Of Band radio Emissions (OOBEs) generated by cellular transmissions into downlink radio channels of a coexisting radio network, such as the police radio network. The invention detects an uplink transmission of the coexistent network radio terminal, and measures its transmitting power level. If the power level exceeds a predetermined threshold, then the downlink radio channel associated with the radio transmission is determined, and further it is determined the cellular downlink channels that create OOBEs that interfere with the downlink radio channel of the coexistent system. Then, the level of OOBEs of the cellular downlink channels are determined, and if at least one exceeds a tolerable OOBE threshold level, the OOBEs of that cellular downlink channel are reduced, by handing over the cellular downlink channel to another cellular downlink channel being more distant in frequency with respect to the coexistent radio network downlink channel, by terminating the cellular call involving the cellular downlink channel, or by reducing the maximum power level of the cellular downlink channel transmission. According to another embodiment, after the downlink radio channel associated with the radio transmission is determined, the method detects all cellular uplink channels in use in the same direction of arrival as the coexistent network radio terminal, determines the level of OOBE generated by the all cellular uplink channels in use, and if at least one of the levels of OOBEs exceeds a predefined threshold level, reduces the OOBE of that cellular uplink channels by handing over the cellular uplink channel to another cellular uplink channel being more distant in frequency with respect to the coexistent radio network downlink channel, by terminating the cellular call involving the cellular uplink channel, or by reducing the maximum power level of the cellular uplink channel transmission.

19 Claims, 7 Drawing Sheets

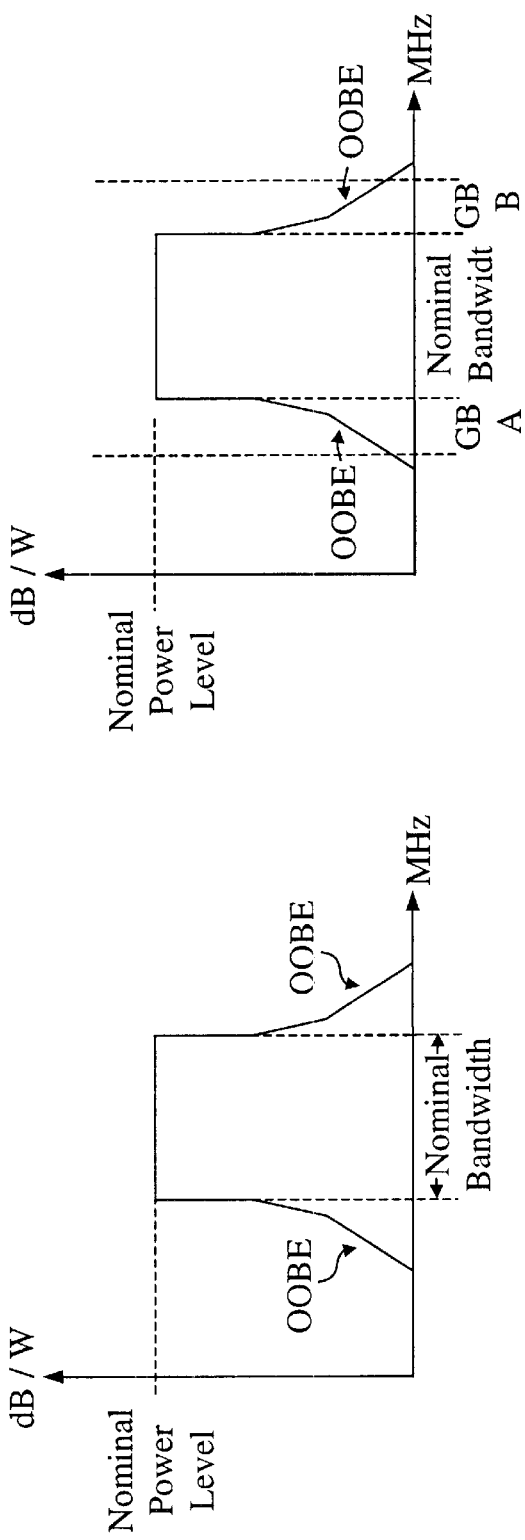
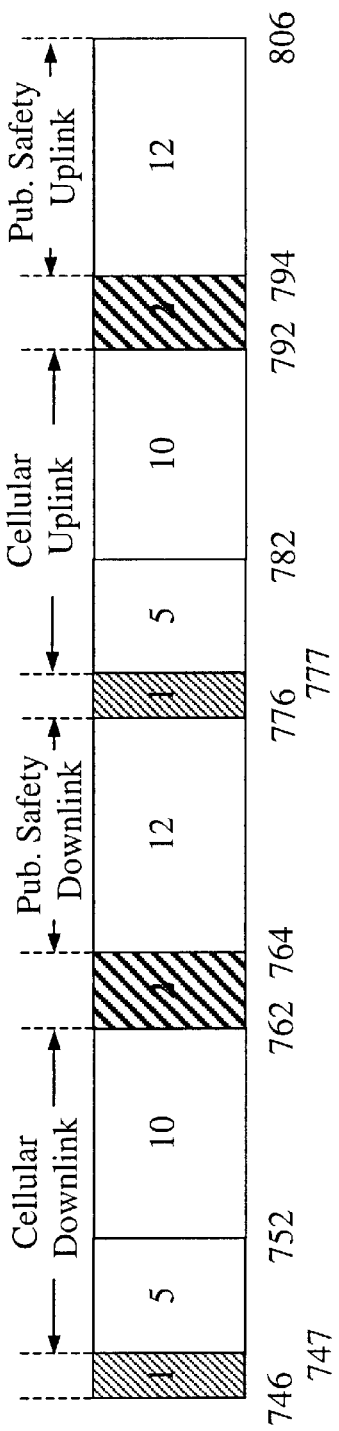
Figure 1.a (Prior Art)
Figure 1.b (Prior Art)
Figure 2 (Prior Art)

SELF-SACRIFICING CELLULAR SYSTEM

BACKGROUND OF THE INVENTION

1. Field of the Invention

The present invention relates to radio telecommunications systems, particularly to a method and system for protecting co-existent wireless application services interfering with cellular telecommunications systems.

2. Description of the Related Art

Cellular and wireless services are known for a number of years, and become more and more popular. In wireless telephony, frequency spectrum is allocated for supporting radio communications between a network and Mobile Stations (MSs). In every national jurisdiction, a public organism, such as for example the Federal Communications Commission (FCC) in the United States of America has authority to manage the allocation of the frequency spectrum to various wireless applications, such as for example for television broadcasting, cellular telecommunications, public safety radio services (police, fire-fighters, or paramedics radio communications), military transmission applications, and others. Since most frequency spectrum holders try to maximize their investment by using high spectral density transmissions in their allocated bandwidth, the interference generated into neighboring frequency spectrums become important and non-negligible. Frequency guard bands, which are non-assigned bands of frequency spectrum, is one known partial remedy for copping with existing frequency interference generated by one system into a second system's allocated frequency spectrum.

For better understanding the concept of Out Of Band radio Emissions (OOBEs), reference is now made to FIG. 1.$a$, wherein there is shown a schematical representation of a frequency spectrum assigned to a radio frequency operator. The allocated frequency spectrum shown in FIG. 1.$a$ has a nominal bandwidth the operator is allowed to use for its radio application, such as for example for operating a cellular telecommunications network. A maximal nominal power level is also set and allowed for the radio transmissions within the nominal bandwidth. However, due to the imperfect nature of transceivers, OOBEs are most always generated outside the nominal bandwidth, as shown. The generated OOBEs may interfere with other radio applications that are allocated the frequency spectrum neighboring the allocated nominal bandwidth.

Reference now being made to FIG. 1.$b$, wherein there is shown another schematical representation of an allocated frequency spectrum assigned to a radio frequency operator. In FIG. 1.$b$, the Guard Bands GB A and GB B are used around the assigned nominal bandwidth for coping with OOBE. In such manner, if there are OOBEs, they are generated within the guard bands, which are not used by any other wireless application.

FIG. 2 illustrates an example of a frequency spectrum assigned in the United States of America, where the FCC has decided to re-allocate frequency spectrum formerly used for Ultra-High Frequency (UHF) television channels 60 through 69, both for new wireless services (cellular network operators) and for public safety radio services (operated by police, paramedics, etc). This frequency spectrum ranges from 746 MHz to 806 MHz. A first license of 5 MHz, and a second license of 10 MHz have been assigned in both downlink and uplink cellular applications, as shown. Adjacent to the cellular applications, but separated by 1 and 2 MHz guard bands, were allocated two 12 MHz frequency spectrums for public safety services, one for the downlink radio transmissions (base station to terminals) and one for public safety uplink radio transmissions (terminals to base station). It was noted in many instances that, for example, cellular downlink transmissions effectuated in the frequency band just before the 762 MHz high-end limit, negatively interfere with the public safety downlink transmissions in the frequency band just above the 764 MHz low-end limit. Furthermore, it was also observed that the uplink cellular transmissions effectuated on radio channels just above the frequency of 777 MHz also create OOBE affecting the public safety downlink radio transmissions on channels just below the 776 MHz limit. These problems may further be accentuated in situations wherein there are no guard bands between the cellular network's spectrum and the coexistent network's spectrum, and when the two systems' sub-bands are used for transmission in the same direction (downlink or uplink).

The interference problems described in relation to FIG. 2 can be better understood with reference to FIG. 3, wherein there is shown a schematical representation of a typical near-far type interference problem involving a cellular network 10 which geographical radio coverage overlaps a coexistent public safety radio network 12 radio coverage. As known in the art, the cellular telecommunications network 10 comprises a plurality of cells 16$i$, each such cell being served by a Base Station (BS) 14$i$. The BSs provide radio service to all MSs within their corresponding cell. For example, in FIG. 3, BS 14$_3$ provides cellular service to MS 18 which is within the cell 16$_3$. The coexistent radio network 12, such as for example a public safety radio network, has itself a central radio station 20 providing radio coverage to its radio terminals, such as to radio terminal 22, over an area typically much bigger than a cell 16$i$. For example, the central radio station 20 may service a police station and thus provide radio service for police radio terminals over an entire city.

Instances arise when a public safety radio terminal such as terminal 22, served by central radio station 20, arrive in positions physically close to a BS of a cellular system, such as BS 16$_3$ of system 10. In such conditions, the radio terminal 22 receives not only a radio frequency signal 21 (attenuated because of the distant location of the terminal 22 with respect its central radio station 20) from its own central station 20, but also a strong interfering radio signal 23 from a close emitter, i.e. from BS 14$_3$, the radio frequency signal 23 being intended not for the terminal 22, but for MSs served by BS 14$_3$, like the MS 18. When the frequencies of signals 21 and 23 are too close, and when like in the example of FIG. 3 the public safety radio terminal is far from its central radio station but physically close to the interfering emitter, the downlink communications between the central station and the terminal are substantially disturbed by the so-called near-far interference, oftentimes to such an extent that the terminal 22 is no longer able to receive communication from the station 20.

Reference is now made to FIG. 4, wherein there is shown an exemplary detailed representation of the near-far interference engendered by a first system, such as a cellular system, into a second system, such as a public safety radio system. In FIG. 4, it is assumed that the cellular telecommunications system 10 shown in FIG. 3 uses the frequency spectrum X, which is divided, like in Time Division Multiple Access (TDMA) based cellular telecommunications networks in a plurality of frequency channels (all cellular systems use radio channel, but they may vary in bandwidth). For the purpose of the present example, it is assumed that the last three frequency channels at the high end of the frequency spectrum X are frequency channels A, B, and C. A Guard Band GB is allocated to separate in frequency the spectrum X used by the cellular telecommunications system 10 from another frequency spectrum Y assigned and used by the radio network 12 of a public safety organization. The frequency spectrum Y is also divided into a plurality of frequency channels, such as for example frequency channels 1, 2 and 3, and so on. FIG. 4 shows that cellular frequency channels A, B, and C are received at a given location within the cell $14_3$ with a given power level, L1. At the same given location, because of the transmission attenuation due to the distance, the public safety radio channels 1, 2, and 3 are received with a second, much lower, power level, L2. Furthermore, as described with reference to FIGS 1.*a* and 1.*b*, the frequency channels A, B, and C engender OOBEs A', B', and C'. In some cases, the bandwidth assigned to the guard band GB is not sufficient for the OOBE of channels A, B, and C to fade off before "reaching" channels 1, 2, and 3 of the other radio application. Therefore, instances arise when the power level of the OOBE of a cellular frequency channel is important enough to be comparable with the power level of some of the downlink frequency channels, such as the channels 1, 2, and 3 of the public safety radio network 12, and thus severely interfere with the public safety radio channels.

Given the life-critical nature of radio communications of the public safety organizations, the radio interference caused by cellular systems and affecting the radio channels used by the public safety organizations should be reduced.

It would be advantageous to have a method and system that solves the above-identified deficiencies. It would be of even further advantage to have a method and system that would automatically eliminate the radio interference engendered by a cellular network into a public safety organization radio network as soon as such an interference is detected.

The present invention provides such a solution.

SUMMARY OF THE INVENTION

It is therefore an object of the present invention to provide in a cellular telecommunications system, a method for reducing Out of Band radio Emissions (OOBE) of a downlink cellular channel, the method comprising the steps of:

finding an uplink radio channel currently being used by a radio terminal of a coexistent radio network for carrying out a radio communication, and determining a transmission power level of the radio communication;

determining if the uplink radio channel communication power level exceeds a predefined tolerable power level threshold;

if the uplink radio channel transmission power level exceeds the predefined tolerable power level threshold, determining a downlink radio channel serving the same radio communication as the uplink radio channel;

determining at least one downlink cellular channel currently in use and that is likely to generate OOBE into the downlink radio channel, and further determining a level of OOBE of the at least one downlink cellular channel;

determining if a level of OOBE of the at least one downlink cellular channel exceeds a predefined tolerable OOBE threshold; and if a level of OOBE of the at least one downlink cellular channel exceeds the predefined tolerable OOBE threshold, reducing the level of OOBE of the at least one downlink cellular channel.

It is another object of the present invention to provide a in a cellular telecommunications system, a method for reducing Out of Band radio Emissions (OOBE) of an uplink cellular channel of a sectored cell, the method comprising the steps of:

finding an uplink radio channel currently being used by a radio terminal of a coexistent radio network for carrying out a radio communication, and determining a transmission power level of the radio communication;

determining if the uplink radio channel communication power level exceeds a predefined tolerable power level threshold;

if the uplink radio channel transmission power level exceeds the predefined tolerable power level threshold, determining a downlink radio channel serving the same radio communication as the uplink radio channel;

determining all uplink cellular channels currently serving Mobile Stations calls in the same direction of arrival as the coexistent radio terminal;

determining a level of OOBE of each one of all uplink cellular channels currently serving Mobile Stations calls in the same direction of arrival as the coexistent radio network terminal;

determining if a level of OOBE of any uplink cellular channels exceeds a predefined OOBE threshold; and if a level of OOBE of at least one of all uplink cellular channels exceeds a predefined OOBE threshold, reducing the level of OOBE of the at least one of all uplink cellular channels.

It is yet another object of the invention to provide in a cellular telecommunications system, a cell radio controller comprising:

at least one radio receiver for finding a current uplink radio channel of a radio terminal of a coexistent radio network and for determining the uplink radio transmission power level;

a comparison device for determining if the uplink radio transmission power level exceeds a predefined tolerable power level threshold;

a processor for determining a downlink radio channel serving the same communication as the uplink radio channel of the radio terminal, and for further determining at least one downlink cellular channel currently in use and that is likely to generate OOBE into the downlink radio channel of the coexistent radio network, and its level of OOBE;

wherein the processor determines if the level of OOBE of the at least one downlink cellular channel exceeds a predefined tolerable OOBE threshold, and if so, instructs a radio transmitter of the cell radio controller to reduce the level of OOBE of the at least one downlink cellular channel.

It is yet another object of the invention to provide in a cellular telecommunications system, a cell radio controller comprising:

at least one radio receiver for finding a current uplink radio channel of a radio terminal of a coexistent radio network and for determining the uplink radio transmission power level;

a comparison device for determining if the uplink radio transmission power level exceeds a predefined tolerable power level threshold;

a processor for determining a downlink radio channel serving the same communication as the uplink radio channel of the radio terminal, and for further determining an identity of all uplink cellular channels currently serving a call in a direction of arrival of the coexistent system uplink transmission and their respective level of OOBEs generated into the coexistent radio network downlink channel;

wherein the processor further determines if the level of OOBEs of at least one of the uplink cellular channels exceeds a predefined tolerable OOBE threshold and if so, reduces the level of OOBE of the of at least one of the uplink cellular channels.

BRIEF DESCRIPTION OF THE DRAWINGS

For a more detailed understanding of the invention, for further objects and advantages thereof, reference can now be made to the following description, taken in conjunction with the accompanying drawings, in which:

FIG. 1.a is a schematical representation of a frequency spectrum assigned to a radio frequency operator;

FIG. 1.b is another schematical representation of a frequency spectrum assigned to a radio frequency operator illustrating the use of frequency guard bands;

FIG. 2 is an example illustrating a portion of the frequency spectrum as assigned in the United States of America;

DETAILED DESCRIPTION OF THE PREFERRED EMBODIMENTS

Figure 5:
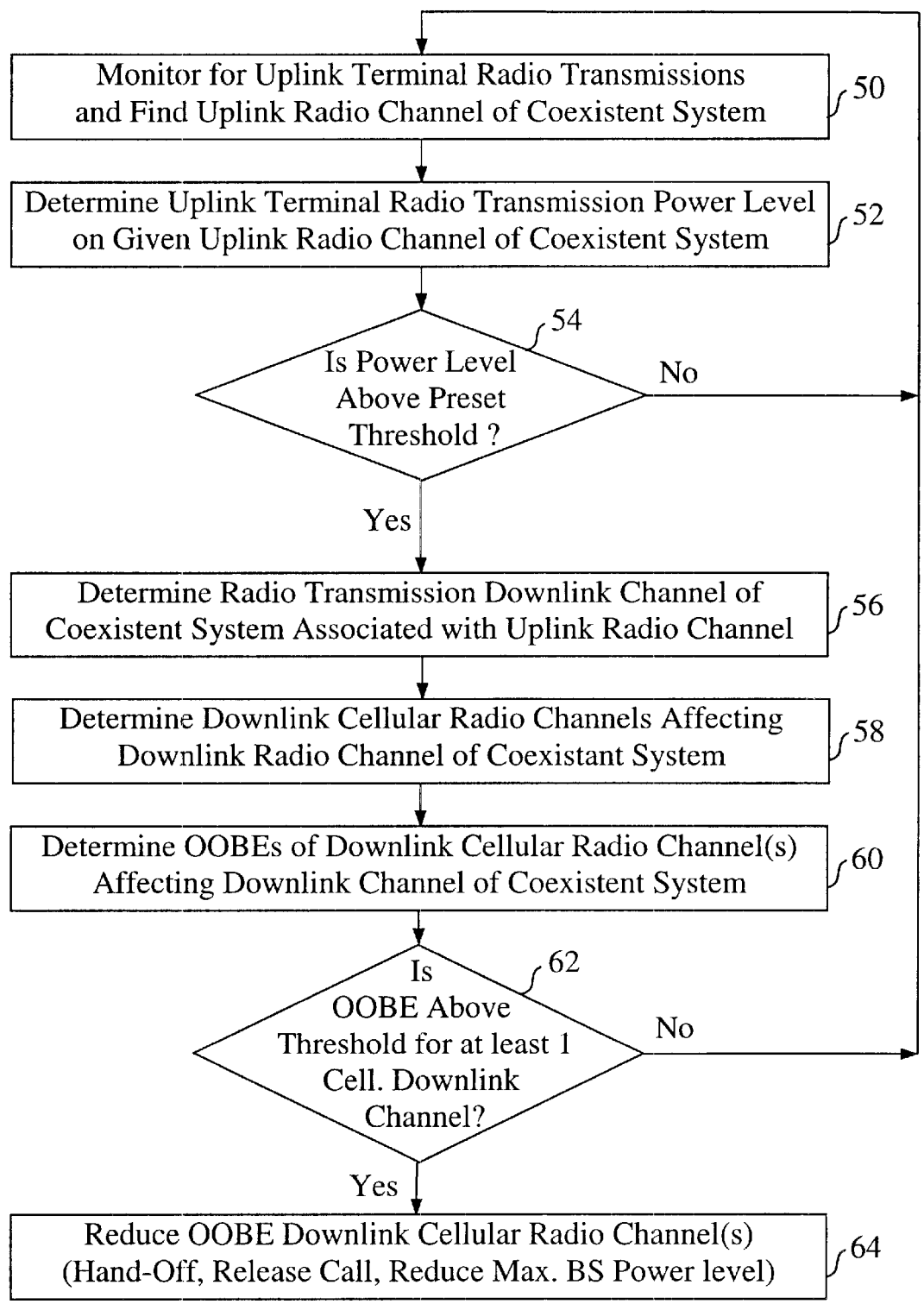
FIG. 5 is an exemplary flowchart diagram of a preferred embodiment of the present invention.

Reference is now made to FIG. 5, wherein there is shown a flowchart diagram representing an exemplary preferred embodiment of the present invention for solving the above-identified deficiencies of the prior art. According to the present preferred embodiment of the invention, the Out Of Band (Radio) Emissions (OOBEs) generated by a cellular telecommunications system's downlink channels that negatively affect particular downlink radio channels of a coexistent radio network (a radio network operating on different frequencies than the cellular telecommunications system, but which radio coverage physically overlaps at least a portion the cellular system's radio coverage) are reduced or eliminated, in situations wherein the co-existent radio network is considered to be of critical nature, such as for example in cases involving public safety radio networks (law enforcement agencies, paramedics, etc). For this purpose, the method of FIG. 5 allows for monitoring the coexistent radio system's uplink channels corresponding to downlink channels that can be affected by cellular downlink communications. Once an active communications is found on a coexistent radio system uplink channel, if its power level exceeds a threshold, then its pair downlink channel is found. Based on the found downlink channel, it is determined whether any cellular downlink channels may negatively affect transmissions over the coexistent system downlink channel. If so, the level of OOBE produced by the cellular downlink channel(s) is reduced or eliminated.

Figure 3:
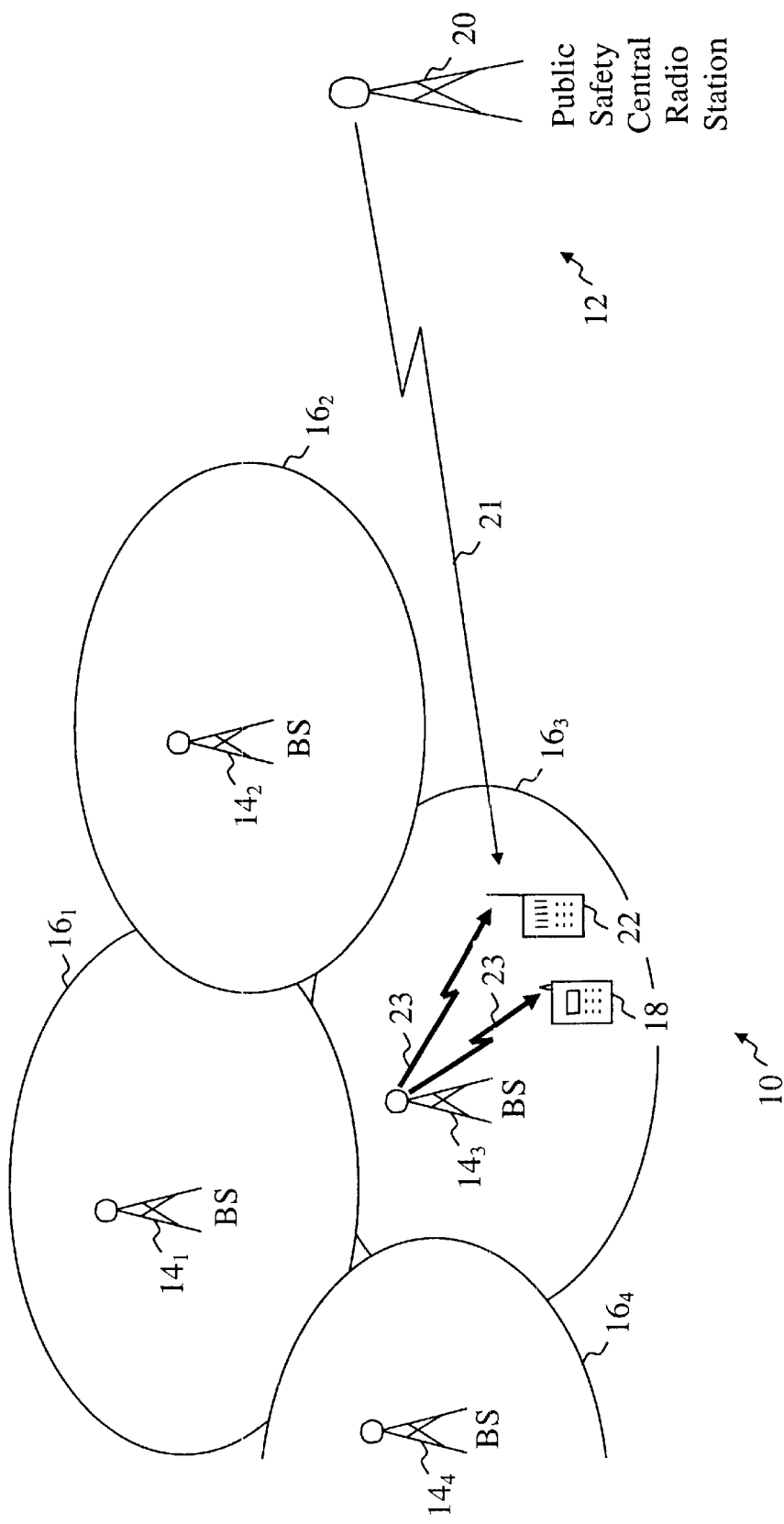
FIG. 3 is a schematical representation of a typical near-far type interference involving a cellular network physically overlapping a public safety radio network.

The method described with reference to FIG. 5 may be implemented in a cellular telecommunications network such as the network 10 of FIG. 3, wherein the cellular telecommunications network 10 has knowledge of the allocated uplink and downlink frequency channels assigned to the coexistent radio network. Since the allocation of the frequency spectrum is governed by national jurisdiction entities, such as the FCC in the Unites States of America, the frequency spectrum allocation is made public in the country so that every interested party can have knowledge of it.

With particular reference being now made to FIG. 5, the invented method starts with step 50, wherein a Base Station (BS), a Base Station Controller (BSC), a Mobile Switching Center (MSC) or any other entity of the cellular network 10 responsible for the radio control of a given cell, hereinafter designated as the cell radio controller monitors for any uplink radio transmission of a coexistent radio network terminal. For that purpose, the given cell radio controller may scan a given frequency spectrum that is known to be utilized by a coexistent public safety radio network. For example, with reference being made back to FIG. 2, the cell radio controller monitors a portion of the frequency spectrum which is of interest, i.e. adjacent to the one used by the given cell of the cellular system 10.

In FIG. 2, if the cellular system 10 uses in cell $16_3$ (shown in FIG. 3) downlink radio channels just below the end-limit frequency of 762 MHz that may create OOBEs in the coexistent radio system downlink channels found just above the low-end limit of 764 MHz, then the scan may be performed on the co-existent radio network uplink radio channels that correspond to those coexistent radio system downlink channels, channels and that are in the frequency spectrum ranging from 794 MHz to 806 MHz.

Figure 4:
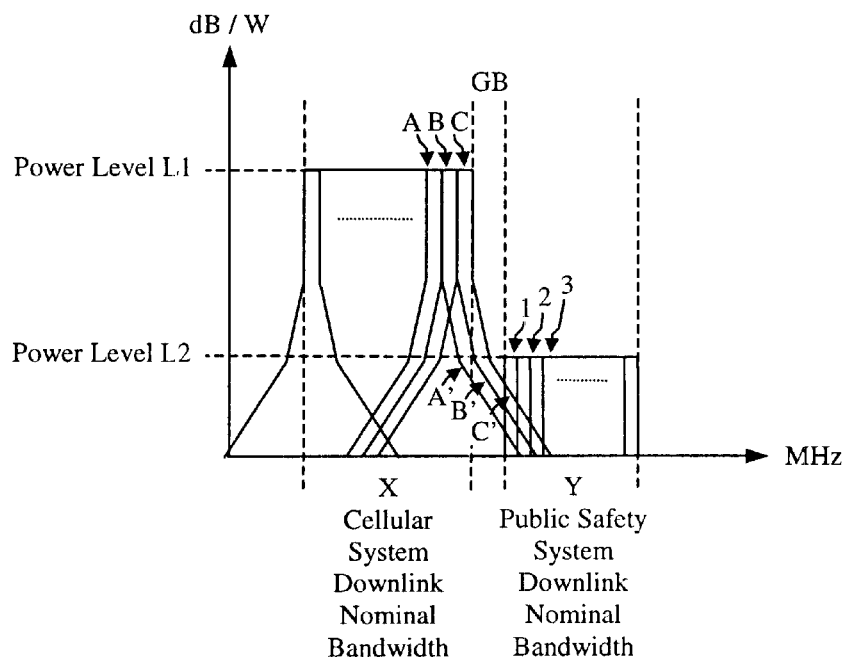
FIG. 4 is an exemplary detailed representation of the near-far interference problem.

With reference being now made specifically to FIG. 5, in step 50, the cell radio controller performing the scan of the uplink channels of interest, finds a current uplink transmission of a radio terminal, such as the terminal 22 of the coexistent network, over one of the monitored uplink channels. In step 52, the method further determines the recorded power level of the coexistent uplink channel transmission, and in step 54 it determines whether or not the recorded transmission power level is above a pre-determined transmission power level threshold set by a network operator. If not, the method returns to step 50 and continues scanning the coexistent radio network channels—of interest. However, if in step 54, the transmission power level is detected to be above the predefined threshold, it is concluded that the coexistent radio network terminal 22 is physically close to the cellular BS $14_3$, and that it is possible that the BS downlink transmission 23 (shown in FIG. 3) may disturb the downlink transmission 21 intended for the terminal 22. Therefore, in step 56 the cell radio controller further determines, based on the known uplink channel used by terminal 22, the current coexistent radio network downlink channel used by the terminal 22 for receiving communications from its central radio station 20. As mentioned, the allocation of the frequency spectrum is of public knowledge, and therefore the cell radio controller may comprise a coexistent radio network frequency table having all the uplink and downlink frequency channels used by the coexistent network, and their relationship. Thus, by knowing an uplink channel of the coexistent network, it is easy to determine the associated downlink channel used for that communication. Alternatively, the downlink and uplink radio channels used by the coexistent radio network may be the same in some implementations called Time Division Duplex (TDD), in which cases the current coexistent radio network downlink channel is the same as the uplink channel. In step 58, the cell radio controller further determines the cellular downlink channels which OOBEs are the most likely to engender interference on the coexistent network downlink radio channel determined in 56. For that purpose, the cell radio controller may associate the coexistent radio network downlink channel found in 56 with the "closest" cell downlink radio channel(s) used in its served cell. For example, with reference being made back to FIG. 2, if the coexistent radio network downlink channel found in 56 is immediately above 764 MHz, then the closest cell downlink channels are the ones immediately bellow 762 MHz. Or, with reference being made to FIG. 4, if the coexistent network downlink channel over which a transmission was detected is channel 1, the cellular channels that are the most likely to interfere with channel 1, are cellular channels A, B, and C. Once the potentially problematic cellular downlink channel(s) is/are found in step 58, the method continues with step 60 wherein it is determined the level of OOBEs of the channels found in 58 that affect the coexistent radio network downlink channels. For this purpose, the cell radio controller may comprise a series of tables associating a cell downlink channel and a coexistent radio network downlink channel with a level of OOBEs generated by the given cell downlink channel into the coexistent radio network downlink channel, based on previously made radio measurements or theoretically computed values. Thus, once the levels of OOBEs generated by each downlink cellular channel found in step 58 are found, the method continues with step 62, wherein each such OOBE level is compared with a predefined OOBE level threshold defining the maximum tolerated level of OOBE in the given coexistent radio network channel. If the levels of OOBEs do not exceed the tolerated level for any of the found cellular downlink channels, the method returns to step 50 and continues the monitoring. However, if for at least one of the cellular downlink channels found in 58, the OOBE found in 60 exceeds the tolerated level of OOBE, then the method continues with step 64, wherein an action is taken to reduce the level of OOBE engendered by the cellular downlink channels into the coexistent radio network channel. For this purpose, step 64 may comprise various actions, such as for example:

- handing-over the cellular downlink channel to another cellular downlink channel which is more frequency-wise "distant" of the coexistent radio network downlink channel, thus freeing the cellular downlink channel that caused the intolerable OOBE;
- terminating the cellular call using the cellular downlink channel that caused the intolerable OOBE, thus freeing the cellular downlink channel that caused the intolerable OOBE;
- reducing the maximum power level allowed for the BS to emit over the cellular 15 downlink channel that caused the intolerable OOBE, thus also reducing the level of OOBE engendered into the coexistent radio network downlink channel. In cases wherein CDMA-based radio technology is used, such as for example IS-95, CDMA2000 and Wideband CDMA, reducing the power level may mean reducing the transmission bit rate which is typically well acceptable for packet data transmission.

The method described with reference to FIG. 5 may be implemented in any cellular telecommunications network that used frequency channels that may create OOBEs into radio channels of another radio system. Preferably, the method is to be applied in situations wherein the proper operation of the other radio system, herein designated as the coexistent radio system, is considered important or critical, as it is the case for example with public safety radio systems enumerated hereinbefore.

Figure 6:
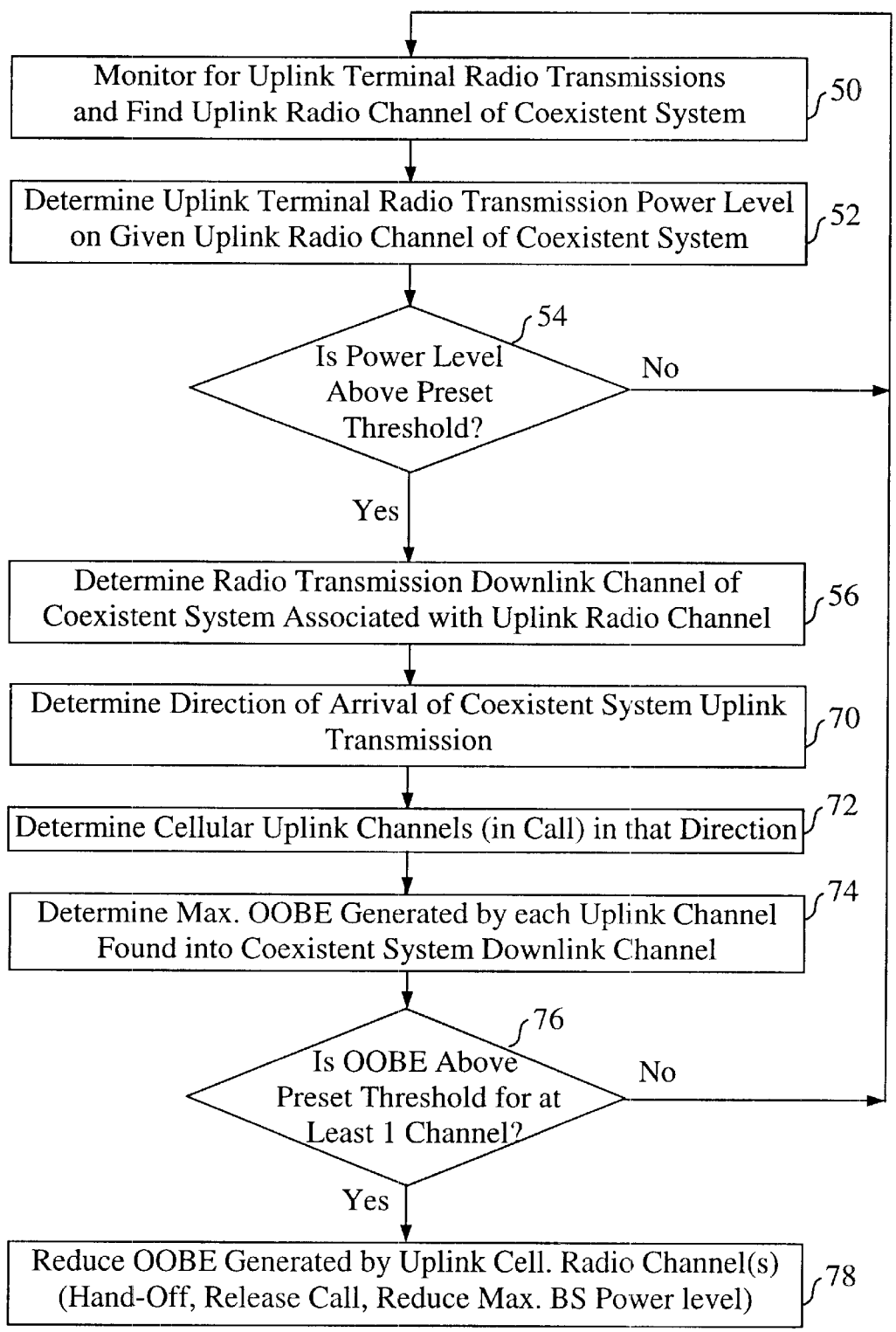
FIG. 6 is an exemplary flowchart diagram of another preferred embodiment of the present invention.

Reference is now made to FIG. 6, wherein there is shown a flowchart diagram of another preferred embodiment of the present invention directed to a method for reducing OOBEs generated by a cellular uplink radio channels into a coexistent system's downlink radio channels, wherein the cellular uplink radio channels are located frequency-wise close to the coexistent system's downlink radio channels.

For this purpose, the method of FIG. 6 monitors the coexistent radio system's uplink channels corresponding to downlink channels that can be affected by cellular downlink communications. Once an active communications is found on a coexistent radio system uplink channel, if its power level exceeds a threshold, its pair downlink channel is found. Based on the found downlink channel, it is determined the direction of arrival of the communication being handled over that downlink channel, as well as all cellular uplink communications being handled in that direction of arrival. Further, it is determined if any of those uplink cellular communications engenders levels of OOBE exceeding a given OOBE threshold. If so, the level of OOBE produced by the cellular uplink channel(s) is reduced or eliminated.

Figure 7:
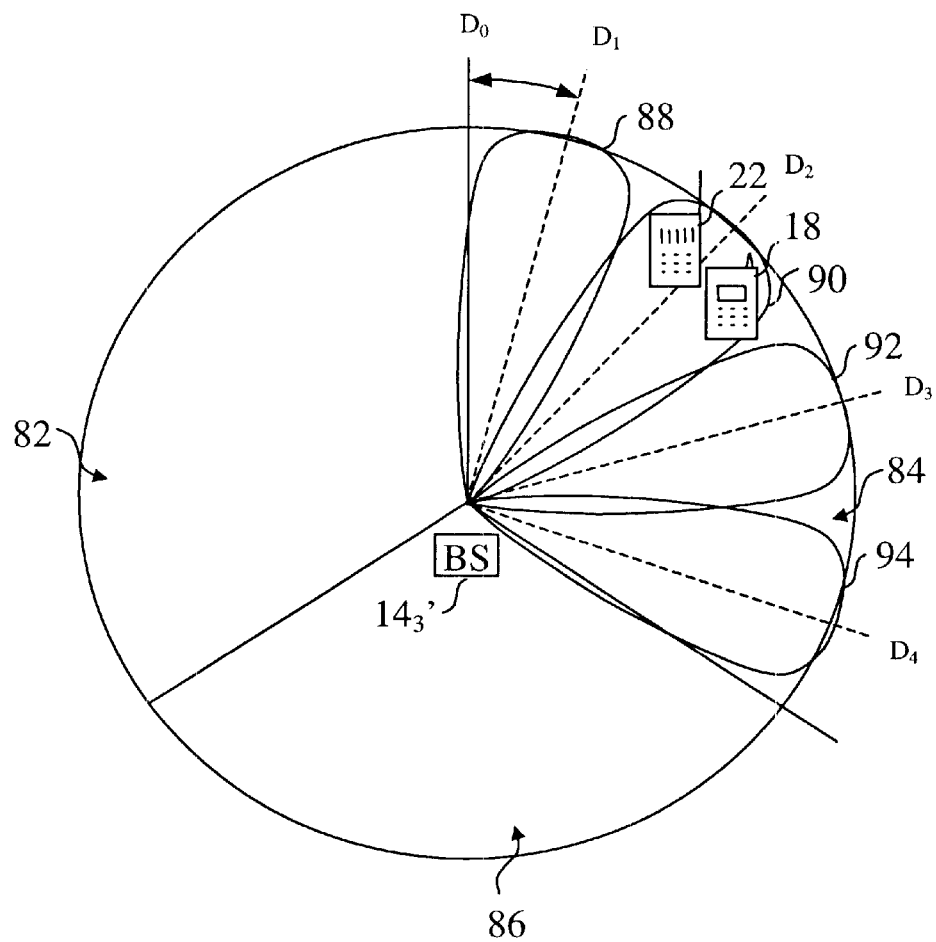
FIG. 7 is an exemplary schematical representation of a sectored cell in which can be applied a preferred embodiment of the present invention.

For better understanding the present preferred embodiment, reference is now made to FIG. 7, wherein there is shown a typical sectored cell 80, having three sectors 82, 84, and 86. In the present example, a sectored cell is shown, although the invention may applied to any kind of cell wherein antenna arrays are used. In the shown sectored cell, the BS $14_3$ is located at the center of the cell, and uses antenna arrays (not shown) for providing radio coverage to each sector 82 through 86. For example, for covering sector 84 of cell 80, the BS $14_3'$ uses an antenna array emitting and receiving over and from four lobes 88, 90, 92, and 94. Each such lobe, has a given direction Di, that is measured from a reference direction D0. In the present example, it is assumed that MS 18 is currently involved in a call with BS $14_3'$, and at the same moment terminal 22 is also in communication with its central radio station 20, both terminals 18 and 22 being physically located within the area covered by same lobe 90 of cell 80.

With reference being now made back to FIG. 6, the invented method starts with steps 50 through 56 as also described hereinbefore with reference to FIG. 5. Following step 56, wherein it is determined the downlink channel used by terminal 22 that currently handles a transmission as mentioned, the method continues by determining the direction of arrival of the terminal 22 uplink transmission, step 70. Since terminal 22 is located in lobe 90 of cell 80, the cell radio controller determines which antenna arrays services that lobe. In step 72, the cell radio controller further determines all the MSs served by the same antenna array and their uplink radio channel, i.e. that are essentially in the same direction of arrival as the terminal 22. In the present example, it is assumed that only one MS 18 is found to be in a call and in the same direction of arrival as terminal 22, i.e. served by the same antenna array as terminal 22. In step 74 the method further determines for each MS found in step 72, the maximum level of OOBEs generated by the uplink MS radio transmissions. For that purpose, the cell radio controller may measure the level of OOBE of each found MS, at a precise moment or over a short period of time, or extract that information from a look-up table comprising an approximation of the maximum OOBE of an MS having that estimated location, on each frequency channel used by the coexistent radio network. In step 76, the cell radio controller compares the level of OOBE found in step 74 for each MS with a predefined OOBE threshold defining the maximum acceptable level of OOBE generated by the cellular system 10 into the downlink channels of the coexistent system. If it is found in step 76 that no MS's OOBE exceeds the threshold, then the method returns to step 50 and the scanning is continued. Otherwise, if in step 76 it is found at least one MS which OOBE exceeds the threshold, the method moves to step 78 wherein an action is taken to decrease the level of OOBE generated by that particular MS' uplink channel into the downlink channel used by the terminal 22. For this purpose, step 78 may comprise various actions, such as for example:

- handing-over the cellular uplink channel to another cellular uplink channel which is more "distant" of the coexistent radio network downlink channel, thus terminating the transmission over the cellular uplink channel that caused the intolerable OOBE;
- terminating the cellular call using the cellular downlink channel that caused the intolerable OOBE, thus freeing the cellular downlink channel that caused the intolerable OOBE;
- reducing the maximum power level allowed for the MS to emit over the cellular uplink channel that caused the intolerable OOBE, thus also reducing the level of OOBE engendered into the coexistent radio network downlink channel.

The methods described with reference to FIGS. 5 and 6 may be implemented in any cellular telecommunications network that uses frequency channels that may create OOBEs into radio channels of another radio system. Preferably, the method is to be applied in situation wherein the proper operation of the other radio system, herein designated as the coexistent radio system, is considered important or critical, as it is the case for example with public safety radio systems enumerated hereinbefore.

Figure 8:
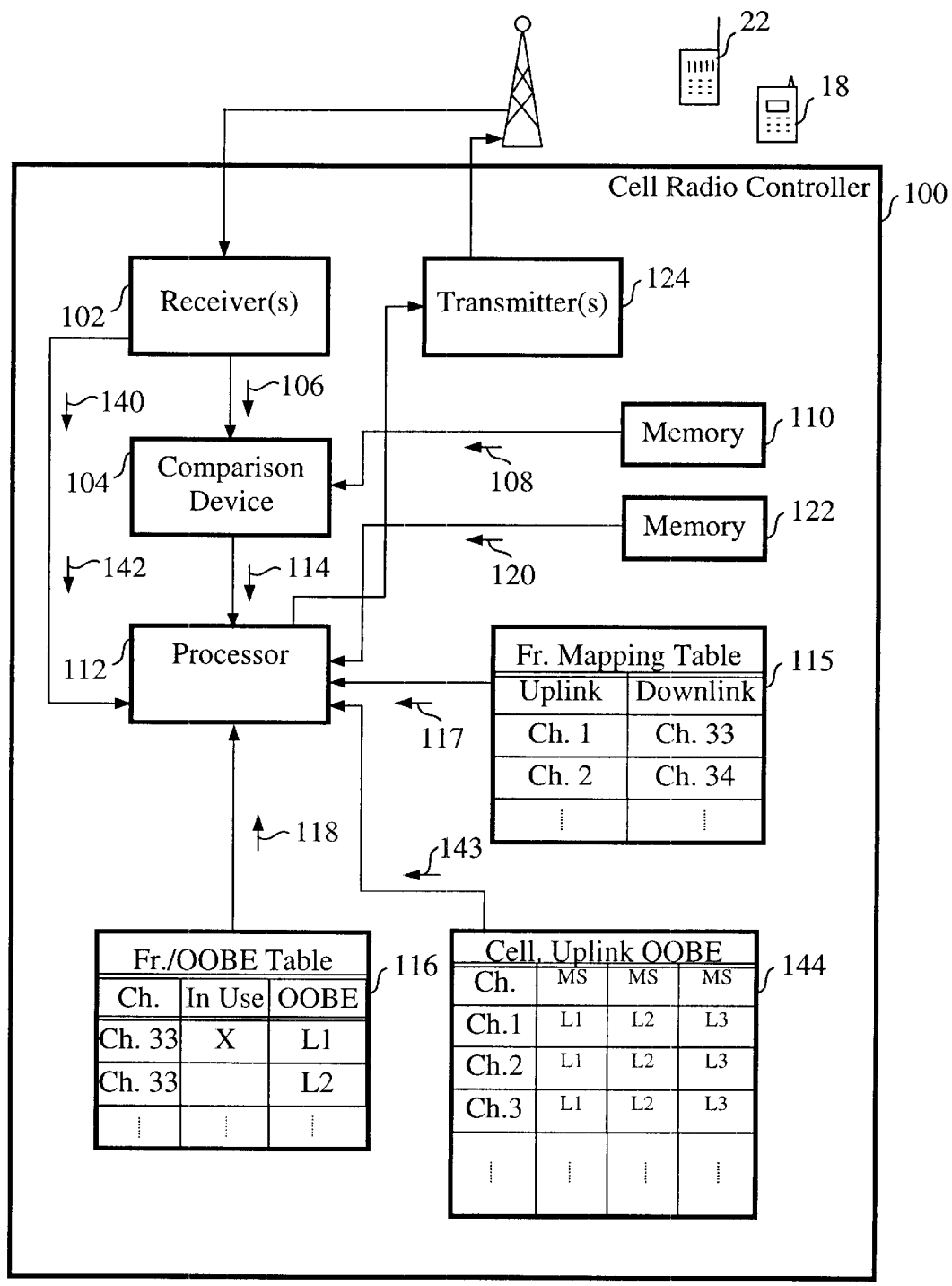
FIG. 8 is a high-level bloc diagram of yet another preferred embodiment of the invention.

Reference is now made to FIG. 8, wherein there is shown the cell radio controller 100 according to the preferred embodiments of the present invention. Both methods described hereinbefore with reference to FIGS. 5 and 6 may be implemented in such a cell radio controller, which may be itself comprised in a base station, a base station controller or in a mobile switching center, depending upon the preferred implementation of a network operator or the particular standard requirements of a given cellular standard. For example, in ANSI-41, the radio control function is performed mainly by the Mobile Switching Center (MSC), and therefore preferably the cell radio controller of the present invention may be implemented in the MSC. In GSM-based technologies, such as in General Packet Radio Service (GPRS) or Enhanced Data Rates for Global Evolution (EDGE), the radio control function is mainly made by base station controller, and therefore in such cases the invention may be implemented in the base station controllers.

The cell radio controller 100 comprises one or more radio receivers 102 for receiving cellular radio communications over uplink radio channels (MS to BS) assigned for use. According to the present invention, at least one of the radio receivers 102 is also set to monitor or scan the uplink radio transmissions of the coexistent radio network 12, as described in step 50 of FIGS. 5 and 6, and for further determining the power level of the uplink radio channel used by the coexistent radio network terminal 22, as described in step 52 of the same figures. The cell radio controller 100 further comprises a comparison device 104 for comparing the recorded power level 106 received from the receiver(s) 102 with the predefined power level threshold 108 received from a memory 110, as described in step 54 of FIGS. 5 and 6. When the result of the comparison is positive, a processor 112 receives from the comparison device 104 the terminal uplink channel identity 114, and determines its associated downlink channel 117 by consulting a mapping table 115 storing the relationship between uplink and downlink channels for the frequency spectrum of interest of the coexistent radio network. Thereafter, the processor 112 determines the downlink cellular channels which OOBE may affect the coexistent network downlink channel, by consulting a look-up table 116 comprising, for each downlink cellular channel that may affect the coexistent radio network downlink, current use information, i.e. if the channel is in use or not, and the level of OOBE engendered by each such cellular downlink channel. Thus, processor 112 obtains from table 116, the level of OOBE of each downlink cellular channel of interest, information 118. Thereafter, the processor 112 proceeds with the comparison of the determined OOBE levels 118 with the predetermined tolerable OOBE threshold 120 obtained from memory 122, as described in relation to step 62 of FIGS. 5. If the result of step 62 is positive, the processor instructs the radio transmitter 124 handling the given downlink cellular communication with cellular terminal 18 on the given downlink cellular channel to take one of the actions described in relation to step 64 of FIG. 5.

For performing the method described with reference to FIG. 6, the cell radio controller acts in a similar manner as for performing the method of FIG. 5, until step 56. For performing step 70, the processor 112 of the radio cell controller 100 may receive from radio receiver 102 the direction of arrival 140 of the coexistent system uplink transmission, and the identity 142 of all uplink cellular channels currently serving a call in that direction. Having the identity of the active uplink channels, the processor obtains the level of OOBEs 143 they generate into the coexistent radio network downlink channel, as described in step 74 of FIG. 6, by interrogating a mapping table 144 having a relation between each uplink cellular channel, and the level of OOBE it generates. The processor then proceeds to the comparison described in step 76 of FIG. 6, and if the result is positive instructs the cellular terminal 18 via the radio transmitter 124, to perform one of the actions described in relation to step 78 of FIG. 6.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. In a cellular telecommunications system, a method for reducing Out of Band radio Emissions (OOBE) of a downlink cellular channel, the method comprising the steps of:
   finding an uplink radio channel currently being used by a radio terminal of a coexistent radio network for carrying out a radio communication, and determining a transmission power level of the radio communication;
   determining if the uplink radio channel communication power level exceeds a predefined tolerable power level threshold;
   if the uplink radio channel transmission power level exceeds the predefined tolerable power level threshold, determining a downlink radio channel serving the same radio communication as the uplink radio channel;

determining at least one downlink cellular channel currently in use and that is likely to generate OOBE into the downlink radio channel, and further determining a level of OOBE of the at least one downlink cellular channel;

determining if a level of OOBE of the at least one downlink cellular channel exceeds a predefined tolerable OOBE threshold; and if a level of OOBE of the at least one downlink cellular channel exceeds the predefined tolerable OOBE threshold, reducing the level of OOBE of the at least one downlink cellular channel.

2. The method claimed in claim 1, wherein the step of reducing the level of OOBE comprises handing over the cellular downlink channel to another cellular downlink channel being more distant in frequency with respect to the downlink radio channel used by the terminal of the coexistent network.

3. The method claimed in claim 1, wherein the step of reducing the level of OOBE comprises terminating a call being handled using the cellular downlink channel and freeing the cellular downlink channel.

4. The method claimed in claim 1, wherein the step of reducing the level of OOBE comprises reducing a maximum power level allowed for a transmission over the cellular downlink channel.

5. The method claimed in claim 1, wherein the step of determining the downlink radio channel serving the same communication as the uplink radio channel for the communication of the radio terminal is performed by consulting a frequency mapping table storing a correspondence relation between at least one uplink radio channel and a downlink radio channel assigned for use to the coexistent radio network.

6. The method claimed in claim 1, wherein the step of determining the at least one downlink cellular channel currently in use and that is likely to generate OOBE into the downlink radio channel of the coexistent radio network, and determining a level of OOBE of the at least one downlink cellular channel, is performed by consulting a mapping table storing a relation between at least one cellular uplink channel in use and a level of OOBEs.

7. In a cellular telecommunications system, a method for reducing Out of Band radio Emissions (OOBE) of an uplink cellular channel of a sectored cell, the method comprising the steps of:

finding an uplink radio channel currently being used by a radio terminal of a coexistent radio network for carrying out a radio communication, and determining a transmission power level of the radio communication;

determining if the uplink radio channel communication power level exceeds a predefined tolerable power level threshold;

if the uplink radio channel transmission power level exceeds the predefined tolerable power level threshold, determining a downlink radio channel serving the same radio communication as the uplink radio channel;

determining all uplink cellular channels currently serving Mobile Stations calls in the same direction of arrival as the coexistent radio terminal;

determining a level of OOBE of each one of all uplink cellular channels currently serving Mobile Stations calls in the same direction of arrival as the coexistent radio network terminal;

determining if a level of OOBE of any uplink cellular channels exceeds a predefined OOBE threshold; and if a level of OOBE of at least one of all uplink cellular channels exceeds a predefined OOBE threshold, reducing the level of OOBE of the at least one of all uplink cellular channels.

8. The method claimed in claim 7, wherein the step of reducing the level of OOBE comprises handing over the at least one of all uplink cellular channels to another cellular uplink channel being more distant in frequency with respect to the downlink radio channel used by the terminal of the coexistent network.

9. The method claimed in claim 7, wherein the step of reducing the level of OOBE comprises terminating the call partly being handled over the cellular uplink channel and freeing the cellular uplink channel.

10. The method claimed in claim 7, wherein the step of reducing the level of OOBE comprises reducing a maximum power level allowed for a transmission over the cellular uplink channel.

11. The method claimed in claim 7, wherein the step of determining the downlink radio channel serving the same communication as the uplink radio channel for the communication of the radio terminal is performed by consulting a frequency mapping table storing a correspondence relation between at least one uplink channel and a downlink channel assigned for use to the coexistent radio network.

12. The method claimed in claim 7, wherein the step of determining if any level of OOBE of one of all uplink cellular channels exceeds a predefined OOBE threshold, is performed by consulting a mapping table storing a relation between at least one cellular uplink channel in use and its level of OOBEs.

13. In a cellular telecommunications system, a cell radio controller comprising:

at least one radio receiver for finding a current uplink radio channel of a radio terminal of a coexistent radio network and for determining the uplink radio transmission power level;

a comparison device for determining if the uplink radio transmission power level exceeds a predefined tolerable power level threshold;

a processor for determining a downlink radio channel serving the same communication as the uplink radio channel of the radio terminal, and for further determining at least one downlink cellular channel currently in use and that is likely to generate OOBE into the downlink radio channel of the coexistent radio network, and its level of OOBE;

wherein the processor determines if the level of OOBE of the at least one downlink cellular channel exceeds a predefined tolerable OOBE threshold, and if so, instructs a radio transmitter of the cell radio controller to reduce the level of OOBE of the at least one downlink cellular channel.

14. The cell radio controller claimed in claim 13 further comprising:

a frequency mapping table storing a relation between the currently used uplink radio channel of the coexistent radio network and an associated downlink radio channel serving the same communication, wherein the processor interrogates the frequency mapping table for obtaining the downlink radio channel serving the same communication as the uplink radio channel of the radio terminal.

15. The cell radio controller claimed in claim 13 further comprising:
- a table storing a relation between the downlink cellular channel currently in use and a level of OOBE it generates, wherein the processor interrogates the table for obtaining the level of OOBE generated by the downlink cellular channel.

16. In a cellular telecommunications system, a cell radio controller comprising:
- at least one radio receiver for finding a current uplink radio channel of a radio terminal of a coexistent radio network and for determining the uplink radio transmission power level;
- a comparison device for determining if the uplink radio transmission power level exceeds a predefined tolerable power level threshold;
- a processor for determining a downlink radio channel serving the same communication as the uplink radio channel of the radio terminal, and for further determining an identity of all uplink cellular channels currently serving a call in a direction of arrival of the coexistent system uplink transmission and their respective level of OOBEs generated into the coexistent radio network downlink channel;
- wherein the processor further determines if the level of OOBEs of at least one of the uplink cellular channels exceeds a predefined tolerable OOBE threshold and if so, reduces the level of OOBE of the of at least one of the uplink cellular channels.

17. The cell radio controller claimed in claim 16 further comprising:
- a frequency mapping table storing a relation between the currently used uplink radio channel of the coexistent radio network and an associated downlink radio channel serving the same communication, wherein the processor interrogates the frequency mapping table for obtaining the downlink radio channel serving the same communication as the uplink radio channel of the radio terminal.

18. The cell radio controller claimed in claim 16 further comprising:
- a table storing at least a relation between an uplink cellular channel currently in use by a cellular terminal in the same direction of arrival, and a level of OOBE it generates, wherein the processor interrogates the table for obtaining the level of OOBE generated by the uplink cellular channel.

19. The cell radio controller claimed in claim 16, wherein for reducing the level of OOBE of the at least one of the uplink cellular channels, the processor instructs the radio transmitter to further instruct the cellular terminal to reduce the level of OOBE of the at least one of the uplink cellular channels.

* * * * *